(12) United States Patent
Barret et al.

(10) Patent No.: US 8,887,997 B2
(45) Date of Patent: Nov. 18, 2014

(54) METHOD FOR MAKING SECURE A TRANSACTION WITH A PAYMENT CARD, AND CENTER FOR AUTHORIZING IMPLEMENTATION OF SAID METHOD

(75) Inventors: Patrick Marie Barret, Paris (FR); Loïc Poilpot, Saint Bonnet les Alliers (FR)

(73) Assignee: Patrick Barret, Paris (FR)

( * ) Notice: Subject to any disclaimer, the term of this patent is extended or adjusted under 35 U.S.C. 154(b) by 834 days.

(21) Appl. No.: 11/885,731

(22) PCT Filed: Mar. 6, 2006

(86) PCT No.: PCT/EP2006/060478
§ 371 (c)(1),
(2), (4) Date: Jun. 6, 2008

(87) PCT Pub. No.: WO2006/092446
PCT Pub. Date: Sep. 8, 2006

(65) Prior Publication Data
US 2009/0127329 A1   May 21, 2009

(30) Foreign Application Priority Data
Mar. 4, 2005   (FR) ..................................... 05 02229

(51) Int. Cl.
| | | |
|---|---|---|
| *G06F 17/00* | (2006.01) | |
| *G06K 5/00* | (2006.01) | |
| *G06Q 40/00* | (2012.01) | |
| *G06Q 20/40* | (2012.01) | |
| *G06Q 20/34* | (2012.01) | |
| *G06Q 20/32* | (2012.01) | |
| *G06Q 20/02* | (2012.01) | |
| *G07F 7/08* | (2006.01) | |
| *G06Q 20/38* | (2012.01) | |

(52) U.S. Cl.
CPC *G07F 7/08* (2013.01); *G06Q 20/40* (2013.01); *G06Q 20/354* (2013.01); *G06Q 20/3255* (2013.01); *G06Q 20/4037* (2013.01); *G06Q 20/02* (2013.01); *G06Q 20/385* (2013.01); *G06Q 20/32* (2013.01)
USPC .............................. 235/380; 235/375; 705/35

(58) Field of Classification Search
USPC ........... 235/380, 375, 378; 705/35, 38–40, 44
See application file for complete search history.

(56) References Cited

U.S. PATENT DOCUMENTS

| 5,550,358 A | * | 8/1996 | Tait et al. ....................... 235/380 |
| 6,016,476 A | * | 1/2000 | Maes et al. ....................... 705/18 |

(Continued)

*Primary Examiner* — Michael G Lee
*Assistant Examiner* — Laura Gudorf
(74) *Attorney, Agent, or Firm* — Blakely Sokoloff Taylor & Zafman

(57) ABSTRACT

The invention proposes a method for the securing of a transaction effected by means of a payment card and involving communication with an authorization center.
It is notable for the use of an activation server in which is stored, in association with each payment card, an activation identifier, and the following stages:
  when a payment with a payment card is envisaged, establishment of a communication with the activation server on the initiative of the card owner, and provision to the said server of an identifier obtained or generated independently of the card itself and aiming to activate the payment card for a limited period,
  at the activation server, if the identifier received matches the stored activation identifier, activation of the payment card for the said limited period,
  during the transaction with the payment card, establishment of a communication between the authorization center and the activation server, with the authorization center delivering an authorization only if the payment card is activated.

7 Claims, 1 Drawing Sheet

(56) References Cited

U.S. PATENT DOCUMENTS

| | | | |
|---|---|---|---|
| 2001/0001204 A1* | 5/2001 | Campisano | 235/380 |
| 2001/0047330 A1* | 11/2001 | Gephart et al. | 705/39 |
| 2003/0182228 A1* | 9/2003 | Wolf | 705/39 |
| 2004/0230536 A1* | 11/2004 | Fung et al. | 705/64 |
| 2005/0038744 A1* | 2/2005 | Viijoen | 705/42 |
| 2005/0116027 A1* | 6/2005 | Algiene et al. | 235/380 |
| 2005/0182720 A1* | 8/2005 | Willard et al. | 705/40 |
| 2006/0006223 A1* | 1/2006 | Harris | 235/379 |

* cited by examiner

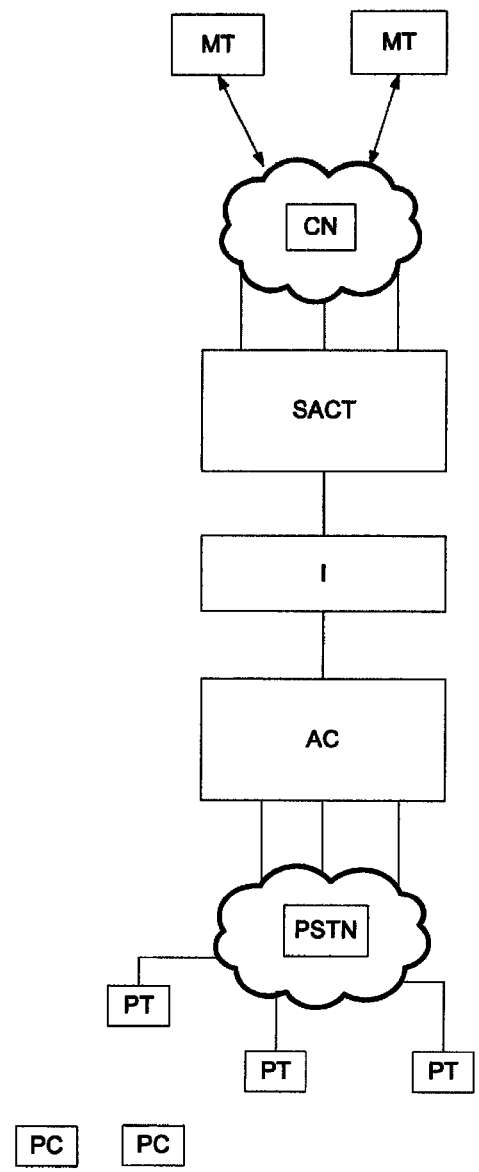

METHOD FOR MAKING SECURE A TRANSACTION WITH A PAYMENT CARD, AND CENTER FOR AUTHORIZING IMPLEMENTATION OF SAID METHOD

The present patent application is a non-provisional application of International Application No. PCT/EP2006/060478, filed Mar. 6, 2006.

In general, this present invention concerns the field of transactions by card, and more specifically a method used to improve the security of transactions, especially financial transactions, effected by card.

It is known that a card transaction, whether it be of the bank, credit-payment or loyalty type, is most often used for just minutes each day, when in fact it is available for use around the clock.

This permanent activation is a weakness in the event of theft or loss, especially between the time when the holder notices the disappearance of his card and that when he reports it according to the procedures appropriate to the type of card.

This weakness is all the greater in the case of a payment on the Internet, or more generally in the case of a conventional remote sale by telephone, where there is no need to physically have the card, but only its numbers.

Fraudulent transactions on the Internet or in remote sales can therefore take place unbeknown to a card holder, who observes the fraud only on receipt of his statement. The user is protected in principle by commercial law, but the fraud exists and it is an impediment to the development of on-line transactions.

This present invention aims to overcome these drawbacks in the current practice, and to add a degree of security to conventional payments by card, without calling into question the existing security processes.

To this end, according to a first aspect, it proposes a method for the securing of a payment transaction effected by means of a payment card, where the said transaction involves communication with a payment authorisation centre, and which can be effected only when authorisation is given by the said centre, this method being characterised in that it includes the execution of an activation server in which, in association with each payment card, an activation identifier is stored, and the following stages:

when a payment with a payment card is envisaged, establishment of a communication with the activation server, on the initiative of the card owner, and the provision to the said server of an identifier obtained or generated independently of the card itself and aiming to activate the payment card for a limited period, at the activation server, if the identifier received matches the stored activation identifier, activation of the payment card for the said limited period, during the transaction with the payment card, establishment of a communication between the authorisation centre and the activation server, with the authorisation centre delivering an authorisation only if the payment card is activated.

Certain aspects of this method, which are preferred but not limiting, are as follows:

the communication with the activation server on the initiative of the owner is established via a communication link chosen from amongst the fixed telephone, the mobile telephone and the Internet.

the activation identifier includes the calling number of a telephone device of the owner.

the activation identifier is contained in an alphanumeric message, in particular an SMS, sent to a predetermined call number.

the activation identifier is transmitted in a periodic manner by the activation server to the equipment used by the card owner in order to establish the communication with the activation server.

the activation identifier is transmitted in an alphanumeric message, in particular an SMS.

the activation identifier is changed periodically by the activation server.

the method also includes, during the activation of the card for a limited period, the sending of a message to the card owner, confirming the said activation.

the said message is an alphanumeric message, in particular an SMS.

the activation identifier includes a confidential code made up by the owner of the payment card.

the method includes, in the event of failure in the establishment of the communication with the activation server on the initiative of the card owner, the establishment of a backup communication with the said activation server.

the method includes, in the event of failure in the establishment of the communication on the initiative of the card owner with the activation server, automatic activation of the payment card according to a predetermined schedule of activation periods.

the activation server and the authorisation centre include a common technical platform.

According to a second aspect, the invention proposes payment authorisation centres using payment cards, of the type that includes communication means for the exchange of data with payment terminals, means for verification of solvency and/or of the existence of a declaration of theft or loss for a given card, and means for the delivery, subject to conditions, of authorisations to the said payment terminals, characterised in that it also includes an interface to a card activation server, and in that the delivery of an authorisation to a payment terminal is also subordinate to the indication received from the said server that a questionable payment card has been activated by an activation identifier obtained or generated independently of the card itself.

Other aspects, aims and advantages of this present invention will appear more clearly on reading the following detailed description of the preferred embodiments of the latter, given by way of a non-limiting example and with reference to the appended drawing, in which the single FIGURE schematically illustrates a payment system architecture that is suitable for implementing the method of the invention.

This method consists firstly of proposing a card transaction or payment that is identical in every way to that of the usual cards, except in one regard, namely that it is inactive in its normal state. It is marked in the databases of the transmitter as being in service, but inactive and therefore unusable in its present state. By default, a payment with this card will not be authorised.

In the event of theft, the thief will therefore be unable to use it. Moreover, an ill-intentioned individual will not be able to use the numbers of the card for a transaction on the Internet.

In order to be able to use the card for a transaction, it is first necessary to activate it by a specific operation. This activation is used to render the card active and therefore usable for a specified limited period, at the end of which the card is returned, in the information system of the transmitter, to the inactive state. A fresh activation is then necessary in order to be able to use it again.

According to one aspect of the invention, the activation of the card for a transaction is effected via channels that are different from those of the payment networks used to authorise transactions. As a consequence, the payment networks and the accepting terminals do not need to be changed and will continue to be used as they are at present. Because of this, this activatable card can be proposed to card holders, and used in the current payment system, without modification of the latter.

By accepting terminals is meant not only the electronic payment terminals used at points of sale, and the automatic dispensers of banknotes (ATMs), but also the dispensers of train tickets, show tickets, etc.

If the card is activated, using any of the processes that are about to be described below, it is recognised as a conventional card, and the transaction takes place. If it is not activated, then it is not recognised by the authorisation centre of the holder, and the transaction is therefore rejected.

It is possible to contemplate any of a number of different activation processes. But whatever the activation process proposed by the card issuer, all of them must allow an identification/authentication of the activation applicant, in order to ensure that it is indeed a request coming from the holder.

In addition, several processes can be proposed simultaneously, with some being used as backup for the usual base, as will be described later in detail.

For example, if a basic process uses the mobile telephone as will be described below, then in the event of loss of the latter, the card holder will still be able to use his card as a result of a pre-programmed backup process.

There now follows a description of a certain number of non-limiting examples of a process for the activation of a card transaction for a limited period. Almost all are usable anywhere in the world, and are independent of the transaction systems proper. The activatable card can therefore be proposed to the holders of international cards.

According to the invention, a method is proposed for a so-called basic activation process, which calls upon advanced communication means, for which a description now follows.

A first basic activation process makes use of a call from a fixed telephone. When registering his contract, the holder gives the number of his fixed telephone. This telephone number will be coupled, in the information system of the transmitter, to the number of the card to be activated.

The card issuer provides the card holder with a telephone number to call in order to access the activation server. Activation is effected from home by calling this number. Authentication can be limited to identifying the calling number, or can ask for the entry of a code on the keypad of the fixed telephone. The activation period can be preprogrammed or specified at each call by a telephone/activation-server keypad dialogue, with the activation server preferably having a voice server function to guide the user.

A second example of a basic activation process employs a mobile telephone. The method is practically the same as that for the fixed telephone, but the method is much more flexible, since the call to the activation server can take place anywhere, and especially in the street in front of a an automatic cash dispenser, some moments before inserting one's card into the appliance, in a shop before going through the checkout, in a restaurant just before asking for the bill, and so on.

Authentication can possibly be reinforced by the entry of a code at the keypad, and/or the sending of a pre-programmed message, typically of the SMS type, containing the first numbers of the card for example.

Activation from a mobile telephone can also take place entirely by sending an SMS. The activation server is then preferably designed to return an acknowledgement of receipt SMS to inform the holder that his card has indeed been activated.

In order to secure the process even further, it is possible to arrange that the transmitter sends out a periodic transmission to the mobile telephone of the user, with encrypted data to be incorporated into an SMS so as to reinforce its authenticity. In a variant and/or in addition, it is possible to provide security by reading the mobile telephone number of the sender conventionally encapsulated in the transmitted SMS.

Activation by mobile telephone is that which, in the current state of the art on the date of deposition of this present application, offers the greatest flexibility in use, and which is therefore preferred.

An example of the architecture in which the above process can be executed is illustrated generally in the FIGURE. This architecture includes a conventional authorisation centre (AC), which is typically connected via the public telephone system (PSTN), to a multiplicity of payment terminals (PT) that are capable of reading payment cards (PC).

Each owner of a card (PC) also has a telephone (here a mobile telephone—MT) capable of entering into communication (here via the cellular network—CN) with an activation server (SACT).

The authorisation centre (AC) is interfaced (interface I) to the activation server (SACT) in order to perform the aforementioned function of verification of the character, active or not active, of a given card.

Where appropriate, the authorisation centre and the activation server can be hosted on a common technical platform.

Returning to the features of the invention, it can be seen that in order to overcome the loss or the theft of the mobile telephone of the user, it is prudent to arrange a subscription to a backup process, such as activation by e-mail for example, or pre-programmed activation (see later).

A third example of a basic activation process according to the invention is activation via the Internet, in which the holder gains access, via the Internet, preferably by means of a standard browser, to the information system of the card issuer, with the same levels of security as those proposed by on-line banking transactions. Advantageously, the user interface is designed to allow a very precise activation of the card with more detailed criteria, such as a transaction ceiling for example, or the value of the transaction that one is preparing to effect, a type of transaction, an indication of the account bank, etc.

This third example of activation according to the invention is particularly well suited to the case of payments via the Internet.

However, by virtue of the new types of mobile terminals that allow roaming access to the Internet, this system can also be activated from a mobile terminal, whether it be a telephone, a personal digital assistant, a terminal of the "Blackberry" type, a notebook computer connected to a public wireless system, and so on.

Processes such as those described above can naturally be enhanced by those skilled in the art, so as to further improve security.

For example, it is possible to arrange for even more elaborate payment cards, containing double identification system for example, between the card itself and the terminal from which the call to the activation server is made. In this case, the activation of a card can be effected, for a given card, only from a designated terminal, with each having to recognise the identity of the other before making the activation call.

As an example, the payment card is constructed not on an inert support, but on a support containing a transponding label called an RFID, and the mobile terminal for its part includes a built-in RFID reader. The memories of the mobile terminal and of the RFID label carried by the payment card contain the respective identities of the terminal and of the card. It is necessary to bring the card close to the mobile appliance for the identification, preferably two-way, to take place between the card and the mobile terminal. And it is only where the double identification has succeeded that the mobile terminal makes the call to the activation server.

It can be seen that the card activation system is one which allows the card holder to have an additional level of protection, without interfering with the other protection methods, whether these be those of the banks or traders, and when a transaction by payment card involves making a call to an authorisation centre server.

In the case of so-called "off-line" payment transactions, meaning where the payment terminal handles the transaction without calling an authorisation centre to verify the solvency of the holder, the activation mechanism is naturally inoperative, but this type of transaction generally occurs in the case of small amounts or in the event of micro-payments such as those to car parks, toll booths, etc.

A second activation process category groups together processes that allow activation of one's card using a backup mode, and so the ability to use the card in the event of a malfunction of the more elaborate systems described above, which is always possible.

This second category includes the following in particular:
a request for activation by post, and preferably by fax or e-mail. The holder writes to the management service the card to request activation for a limited period. Authentication of the applicant is then provided by any appropriate means, such as a pre-determined confidential code.

predetermined activation, in which at the time of signing the contract for provision of the activatable card, the holder chooses a periodicity of automatic activation according to a schedule which can be of any complexity, depending on the use of the card. For example, activation can occur automatically every day for one hour, between 10 am and 11 am, or every hour for 5 minutes, or for 2 hours on Saturday morning, not at all on Sunday, and then 1 hour each day during the week, and so on. Any profile can be envisaged. The holder then has no need of a procedure for activation of the card. He only has to remember the predetermined activation periods. This system can be proposed always, or by request as a backup for a failure of the basic activation system (cellular network failure, failure of the external communication equipment of the activation server, etc.).

Numerous variants and modifications can be made to the invention.

The invention claimed is:

1. A method for the securing of a payment transaction effected by means of a payment card, wherein the transaction involves a communication with a conventional payment authorization center, and which can be effected only when authorization is given by the said center, the method including the use of an activation server in communications with the payment authorization center and in which is stored, in association with each payment card, an activation identifier, and the following steps:
   when a payment with a payment card is envisioned, establishment of a phone communication with the activation server on the initiative of the card owner with a mobile telephone device of said owner, and the provision to the server of an identifier obtained or generated independently of the card itself and aiming to temporarily activate the payment card for a limited period, the activation identifier consisting of the calling number of said telephone device of the owner and wherein the authentication is made by identifying the calling number of the telephone device of the owner,
   at the activation server, if the identifier received matches the stored activation identifier, automatic temporary activation of the payment card for the said limited period, in response to said matching, and then automatic deactivation of the payment card, after the limited period has elapsed,
   during a subsequent conventional transaction with the payment card, establishment of a Communication between the conventional payment authorization center and the activation server, with the authorization center delivering an authorization only if the temporary activation of the payment card is still valid.

2. The method according to claim 1, wherein the method also includes, during the activation of the card for a limited period, the sending of a message to the card owner, confirming the activation.

3. The method according to claim 2, wherein the message is an alphanumeric message, in particular an SMS.

4. The method according to claim 1, wherein the method includes, in the event of failure in the establishment of the communication with the activation server on the initiative of the card owner, the establishment of a backup communication with the said activation server.

5. The method according to claim 1, wherein the method includes, in the event of failure in the establishment of the communication with the activation server on the initiative of the card owner, the automatic activation of the payment card according to a predetermined schedule of activation periods.

6. The method according to claim 1, wherein the activation server and the authorization center include a common technical platform.

7. A card activation server including:
   memory in which activation identifiers are stored in association with a plurality of payment cards, the activation identifiers including the calling numbers of mobile telephone devices of respective payment card owners,
   phone interface for the establishment of communications between the card activation server and mobile phones of respective payment card owners,
   authenticator able to identify the calling numbers of the mobile telephone devices of the owners,
   interface to a standard payment card authorization center for payment cards, including communication means for exchange of data with payment terminals, means for verification of solvency and/or of the existence of declaration of theft or loss for a given card, and means for the delivery, subject to conditions, of authorization to the payment terminals, wherein the card activation server is configured to automatically transmit to the authorization center an indication that a payment card is temporarily activated for a limited time period in response to the identification of an activation identifier that includes the calling number of the mobile telephone device of the owner.

* * * * *